United States Patent [19]

Cloud

[11] Patent Number: 4,684,467
[45] Date of Patent: Aug. 4, 1987

[54] OIL SEPARATOR
[75] Inventor: John A. Cloud, Kingston, Mass.
[73] Assignee: Energy Machinery, Rockland, Mass.
[21] Appl. No.: 870,988
[22] Filed: Jun. 5, 1986
[51] Int. Cl.⁴ .......................................... B01D 17/025
[52] U.S. Cl. ................................. 210/519; 210/532.1; 210/540; 210/800
[58] Field of Search .................... 210/519, 800, 532.1, 210/538, 540, 801; 406/155; 138/103, 111, 114, 115

[56] References Cited

U.S. PATENT DOCUMENTS

| | | | |
|---|---|---|---|
| 1,702,612 | 2/1929 | Morse | 210/519 |
| 2,808,933 | 10/1957 | Mobley | 210/800 |
| 3,527,348 | 9/1970 | LaLonde et al. | 210/540 |
| 3,804,252 | 4/1974 | Rishel | 210/532.1 |
| 4,595,317 | 6/1986 | Möller et al. | 138/111 |

Primary Examiner—Benoit Castel
Assistant Examiner—Richard D. Jordan
Attorney, Agent, or Firm—Wolf, Greenfield & Sacks

[57] ABSTRACT

An oil-water separator includes a vessel having an inlet for the oil and water mixture. A vertical conduit positioned in the vessel has an inlet near the bottom of the vessel. A horizontal conduit is sealingly coupled between the vertical conduit and a first opening in the vessel wall at a level above the inlet to the vertical conduit. The first opening defines a water outlet. A second opening in a wall of the vessel above the level of the first opening defines an oil outlet. The inlet for the oil and water mixture can include a diffuser to prevent turbulence caused by air and high velocity liquid flow.

3 Claims, 5 Drawing Figures

OIL SEPARATOR

FIELD OF THE INVENTION

This invention relates to apparatus for separating a first liquid from a second liquid of lower specific gravity and, more particularly, to a simple, low cost oil separator for removing oil from water being discharged into drains.

BACKGROUND OF THE INVENTION

In industry there is frequently a need for separating oil from water before it reaches a sewer drain. Water containing oil is frequently discharged from air compressors, aftercoolers and air dryers. The need to maintain clean water supplies has made it increasingly important to remove the oil from water before discharge into sewer drains.

Separators for oil and water are known in the prior art and usually involve a vessel having an inlet for the oil and water mixture, a system of baffles and separate outlets for oil and water. U.S. Pat. No. 2,090,813 discloses apparatus including a series of horizontal baffles forming a zigzag liquid path between inlet and outlet. U.S. Pat. No. 4,396,508 discloses a separator wherein the mixture is introduced in the lower portion of the vessel and an inclined separator baffle divides the vessel between a water outlet and an oil outlet.

It is a general object of the present invention to provide novel apparatus for separating a first liquid from a second liquid of lower specific gravity.

It is another object of the present invention to provide apparatus for separating liquids of different specific gravity which is simple in construction, has no moving parts and operates without consumption of energy.

SUMMARY OF THE INVENTION

According to the present invention, these and other objects and advantages are achieved in apparatus for separating a first liquid from a second liquid of lower specific gravity. The apparatus comprises a vessel having inlet means for a mixture of first and second liquids, a generally vertical conduit in the vessel, the conduit having an inlet near the bottom of the vessel, a first outlet for the first liquid, and a second outlet for the second liquid. A generally horizontal conduit is sealingly coupled between the vertical conduit and a first opening in a wall of the vessel at a level above the inlet to the vertical conduit. The first opening defines a first outlet for said first liquid such that the first liquid reaches the first outlet only by passing through the inlet to the vertical conduit, and such that the horizontal conduit establishes the level of the first liquid in the vessel. The second outlet comprises a second opening in a wall of the vessel above the level of the first outlet.

The inlet means for the mixture is preferably positioned above the liquid level in the vessel and includes a diffuser for preventing turbulence in the vessel caused by air and high velocity liquid flow. The vertical conduit preferably extends from the inlet near the bottom of the vessel to above the liquid level.

In operation, the first liquid, such as water, settles to the bottom of the vessel and passes through the vertical conduit to the first outlet. The second liquid, such as oil, remains at the top and passes out through the second outlet.

BRIEF DESCRIPTION OF THE DRAWINGS

For a better understanding of the present invention together with other and further objects, advantages and capabilities thereof, reference may be had to the accompanying drawing in which.

DETAILED DESCRIPTION OF THE INVENTION

Figure 1:
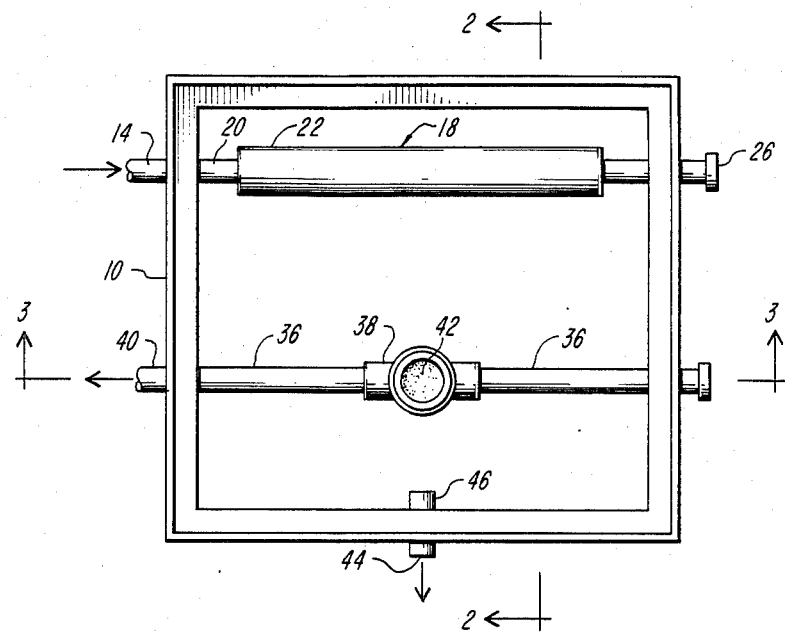
FIG. 1 is a top view of an oil-water separator in accordance with the present invention.
Figure 2:
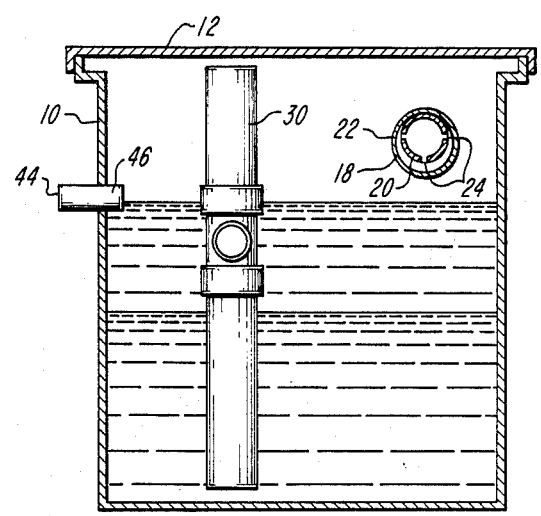
FIG. 2 is a cross-sectional view of the oil-water separator of FIG. 1 taken through the line 2—2.
Figure 3:
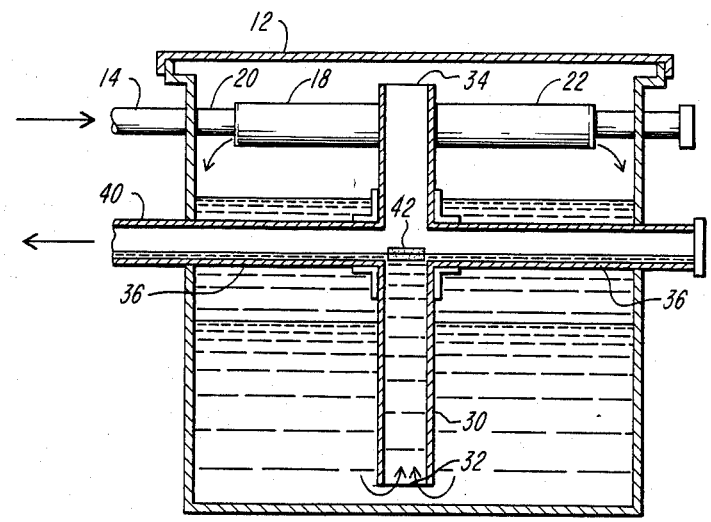
FIG. 3 is a cross-sectional view of the oil-water separator of FIG. 1 taken through the line 3—3.

The oil-water separator of the present invention illustrated in FIGS. 1-3 includes a vessel 10 provided with a cover 12. The vessel 10 can be any suitable plastic or metal material. A mixture of oil and water is received through a conduit 14 through the wall of the vessel 10. Inside the vessel 10, the conduit 14 is connected to a diffuser 18. The diffuser 18 includes a first pipe 20 extending horizontally above the normal liquid level to and through the opposite wall of the vessel 10. A second pipe 22 of larger diameter and shorter length than the first pipe 20 surrounds the first pipe 20 and can be secured thereto by waterproof cement. The first pipe 20 is provided with a plurality of holes 24 in the portion inside the second pipe 22 for passage of the oil-water mixture. The end of the first pipe 20 can be closed with an end cap 26 or can be connected to another drainage pipe.

Mounted in the vessel 10 is a vertical conduit 30 which can be a length of PVC pipe. The vertical conduit 30 extends from a water inlet 32, near the bottom of the vessel 10, to an upper end 34, near the top of the vessel and above the normal liquid level. The water inlet 32 and the upper end 34 are both open. A generally horizontal conduit 36 is coupled from the vertical conduit 30, typically by a T-connector 38, through the wall of the vessel 10 to a water outlet 40. The horizontal conduit 36 and the T-connector 38 are sealed to the vertical conduit 30 and to the wall of the vessel 10 so that water discharged from the vessel through the outlet 40 can only be received through the water inlet 32 at the lower end of the conduit 30 (since the upper end 34 is above the liquid level). An oil-absorbing pad 42 is preferably placed in the vertical conduit 30 so as to float on the surface of the water therein and absorb any residual oil present at this point. The vertical conduit 30 can be supported within the vessel 10 by any convenient mounting arrangement such as, for example, one or more supports extending from the sidewall of the vessel. Two horizontal conduits 36 extending from opposite sidewalls can provide a sturdy support for the vertical conduit 30, as shown in FIG. 3.

The oil separator in accordance with the present invention is further provided with an oil outlet 44 which can be a section of pipe or conduit 46 mounted in a wall of the vessel 10 at a level above the level of the water outlet 40.

In operation, the oil and water mixture is supplied through the conduit 14 to the diffuser 18 and is discharged through the holes 24 in first pipe 20 into the second pipe 22. The mixture is intercepted by the second pipe 22 and discharged through opposite ends of the second pipe 22 into the vessel 10. The diffuser 18 prevents air passing through the conduit 14 with the oil and water mixture from causing disturbance and turbulence within the vessel 10. In addition, the diffuser 18 slows down any high velocity liquid flow and prevents turbulence in the liquid in the vessel except near the surface. As a result, the main body of liquid in the vessel 10 remains relatively stationary without substantial turbulence, thereby promoting separation of the oil and water. As is well-known in the art, the oil portion rises to the surface, while the water drops to the bottom of the vessel due to the lower specific gravity of the oil. Liquid flows into the vertical conduit 30 from the inlet 32. Since the inlet to the vertical conduit 30 is in the lower portion of the vessel, well below the level of the oil, relatively pure water is present in the vertical conduit 30. When the liquid in the vessel 10 reaches the level of the horizontal conduit 36, clean water begins to flow from the vessel through the water outlet 40. Oil builds up on the surface of the water until it reaches the level of the oil outlet 44 and the conduit 46, at which time oil is discharged from the vessel through oil outlet 44.

It can be seen that the water level in the vessel is regulated to the level of the water outlet 40, while the oil above the water level is regulated to the level of the oil outlet 44. The liquid level can temporarily rise above this normal level during high input flow conditions. However, even during such times, clean water is discharged from the water outlet 40.

Figure 4:
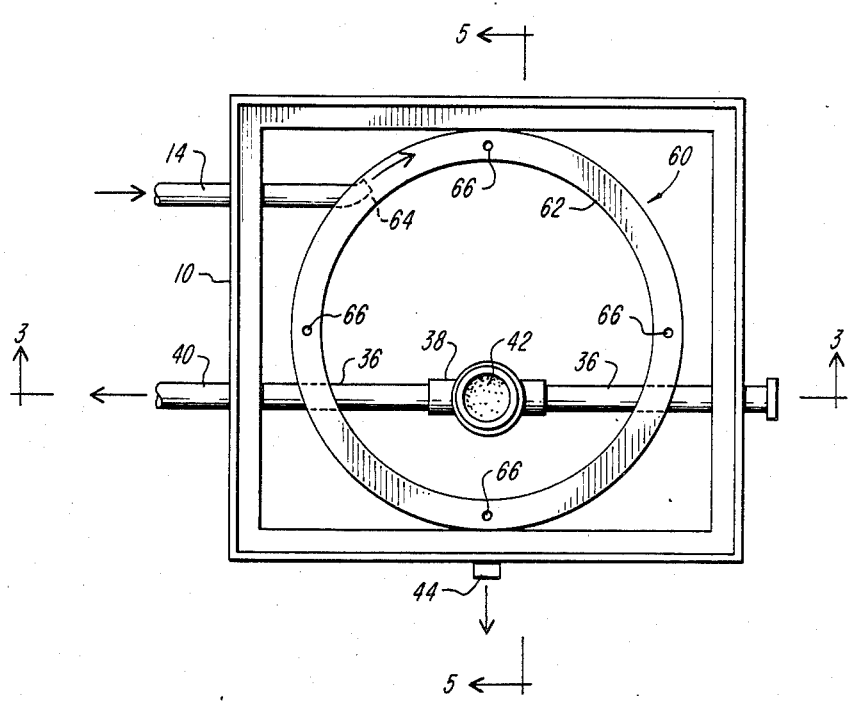
FIG. 4 is a top view of an oil-water separator according to another preferred embodiment of the present invention.
Figure 5:
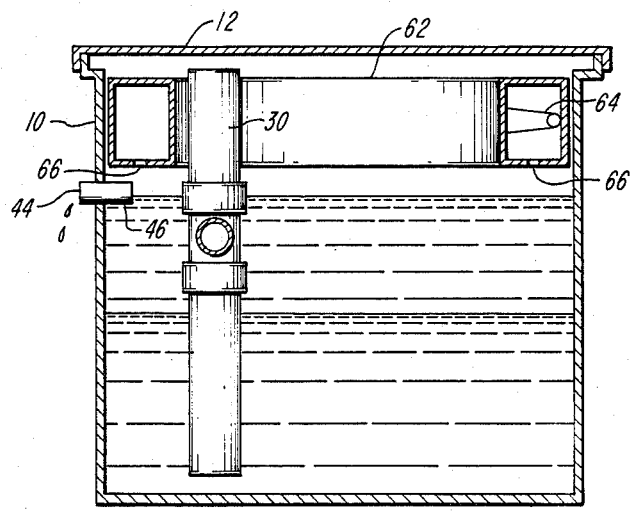
FIG. 5 is a cross-sectional view of the oil-water separator of FIG. 4 taken through the line 4—4.

Another preferred embodiment of the present invention utilizing a circular diffuser 60 is shown in FIGS. 4 and 5. The remainder of the oil separator is as shown in FIGS. 1-3 and described above. The circular diffuser 60 comprises a closed circular tube 62 mounted within the vessel 10 above the liquid level. The tube 62 has a rectangular cross-section. However, tubes having other cross-sectional shapes can be utilized. The liquid to be separated is introduced through the conduit 14 and through the wall of tube 62 to a tangential nozzle 64 located within the tube 62. The tube 62 is provided with a plurality of small holes 66 in its lower wall through which the liquid trickles into the vessel 10.

In operation, the oil and water mixture is directed through the nozzle 64 and flows within the tube 62 generally around the outer periphery, while air in the mixture stays near the inner periphery. The mixture then trickles through the holes 66 to be separated as described above. The circular diffuser 60 provides the advantage of removing turbulence and slowing down the oil and water mixture entering the vessel 10. The diffuser 60 has some holding capacity and allows the mixture to trickle slowly and without turbulence into the vessel 10. This feature is particularly useful when the oil in the mixture has a density close to that of water. In this case, the water outlet must be close to the level of the oil outlet. The low turbulence, slow inflow reduces the tendency for a portion of the water to flow out the oil outlet.

While there has been shown and described what is at present considered the preferred embodiments of the present invention, it will be obvious to those skilled in the art that various changes and modifications may be made therein without departing from the scope of the invention as defined by the appended claims.

What is claimed is:

1. Apparatus for separating a first liquid from a second liquid of lower specific gravity comprising:
   a vessel having inlet means for a mixture of the first and second liquids positioned above the liquid level in said vessel and including diffuser means for preventing turbulence in said vessel caused by air and high velocity liquid flow, said diffuser means comprising as inner pipe having a plurality of holes, and an outer pipe of shorter length than said inner pipe and surrounding said inner pipe for intercepting the mixture passing through said holes and directing the mixture through opposite ends of the outer pipe;
   a generally vertical conduit in said vessel, said conduit having an inlet in the lower part of said vessel;
   a generally horizontal conduit sealingly coupled between said vertical conduit and a first opening in a wall of said vessel at a level above the inlet to said vertical conduit, said first opening providing a first outlet for said first liquid such that said first liquid reaches said first outlet only by passing through the inlet to said vertical conduit and such that said horizontal conduit establishes the level of said first liquid in said vessel; and
   a second outlet for said second liquid comprising a second opening in a wall of said vessel above the level of said first outlet.

2. Apparatus as defined in claim 1 wherein said vertical conduit extends from said inlet near the bottom of said vessel to above the liquid level in said vessel.

3. Apparatus for separating a first liquid from a second liquid of lower specific gravity comprising:
   a vessel having inlet means for a mixture of the first and second liquids positioned above the liquid level in said vessel and including diffuser means for preventing turbulence in said vessel caused by air and high velocity liquid flow, said diffuser means comprising a closed tube positioned above the liquid in said vessel and a tangential nozzle in said tube for directing the mixture around the periphery of said tube, said tube having a plurality of openings to permit the mixture to trickle into said vessel;
   a generally vertical conduit in said vessel, said conduit having an inlet in the lower part of said vessel;
   a generally horizontal conduit sealingly coupled between said vertical conduit and a first opening in a wall of said vessel at a level above the inlet to said vertical conduit, said first opening providing a first outlet for said first liquid such that said first liquid reaches said first outlet only by passing through the inlet to said vertical conduit and such that said horizontal conduit establishes the level of said first liquid in said vessel; and
   a second outlet for said second liquid comprising a second opening in a wall of said vessel above the level of said first outlet.

* * * * *